United States Patent [19]
Yoshioka et al.

[11] Patent Number: 5,242,224
[45] Date of Patent: Sep. 7, 1993

[54] TEMPERATURE MONITORING UNIT

[75] Inventors: Shunsuke Yoshioka; Kenichi Hisamatsu; Keiji Yoshikawa; Shozo Kaneko; Nobuya Watanabe, all of Nagasaki, Japan

[73] Assignee: Mitsubishi Jukogyo Kabushiki Kaisha, Tokyo, Japan

[21] Appl. No.: 823,364

[22] Filed: Jan. 21, 1992

[30] Foreign Application Priority Data

Jan. 18, 1991 [JP] Japan .................... 3-4358

[51] Int. Cl.$^5$ .............. G01J 1/00; G01N 23/00; G01N 25/72
[52] U.S. Cl. ........................ 374/153; 165/8; 236/DIG. 15; 250/347; 356/43; 374/5
[58] Field of Search .......... 374/121, 129, 125, 124, 374/5, 153; 236/69, DIG. 15; 250/347; 356/43, 51; 165/8

[56] References Cited

U.S. PATENT DOCUMENTS

| | | | |
|---|---|---|---|
| 3,630,085 | 12/1971 | Roney et al. | 374/129 |
| 3,766,539 | 10/1973 | Bradshaw et al. | 250/347 X |
| 4,316,088 | 2/1982 | Cobier et al. | 374/153 X |
| 4,435,093 | 3/1984 | Krause et al. | 374/129 |
| 4,671,674 | 6/1987 | Detronde | 374/124 X |

Primary Examiner—Daniel M. Yasich
Attorney, Agent, or Firm—Wenderoth, Lind & Ponack

[57] ABSTRACT

A temperature monitoring unit has a high degree of sensitivity and reliability even when monitoring the temperature of a relatively large rotary heating element. The temperature monitoring unit includes a mirror which is provided in the vicinity of the rotary heating element and is oriented to reflect infrared rays from the heating element in the radial direction thereof, the mirror being reciprocated linearly in the radial direction, a condenser lens provided radially outwardly of the heating element for converging the infrared rays reflected by the mirror, an infrared sensor on which the converged rays impinge, a plate provided between the mirror and the lens and which has a slit therein that is elongate in a direction approximately perpendicular to the surface of the heating element, and an image processor receiving the output of the infrared sensor. The sensitivity is high because infrared rays from around the thermal point of the heating element are blocked by the plate. Moreover, because the visual field is elongate in the radial direction of the heating element, the mirror can quickly scan the entirety of the heating element.

11 Claims, 7 Drawing Sheets

$S/N \propto D/A$

TEMPERATURE MONITORING UNIT

BACKGROUND OF THE INVENTION

1. Field of the Invention

The present invention relates to a temperature monitoring unit useful for monitoring the heated state of a rotary heating element of an air preheater in a thermal power plant, etc.

2. Description of the Related Art

A mirror is provided within a duct of an air inlet of a conventional temperature monitoring unit for monitoring the heated state of a rotary heating element of a rotary regenerative air preheater. The mirror reflects light of a thermal point (abnormally high temperature portion) of the heating element in the radial direction of the heating element and is movable in the radial direction to scan the heating element. Devices converge the reflected light toward an infrared sensor via a circular lens (about 150 $\phi$). The light is image-processed and the output of the infrared sensor is so displayed.

However, the prior art unit presents the following problems.

a) The sensitivity of the device for converging and detecting the reflected light from the heating element via the circular lens is restricted by the diameter of the lens when a thermal point (abnormally high temperature portion) of a heating element of a large power generation unit is to be detected. Therefore, the scanning of the entire area of the heating element having a large diameter takes a long time, whereby a fire may not be detected in its early stage.

b) In order to shorten the scan time, the use of a plurality of circular lenses (diameter 150 $\phi$) or of a large diameter lens may be considered. However, the former idea requires a space for accommodating or storing the mirrors within the duct to be large, which is not desirable. The latter idea is not preferable in terms of the function of the unit because the visual field of detection is enlarged and the sensitivity of the infrared sensor for detecting the thermal point, i.e. the ratio S/N of an area of the thermal point to an area of the lens, is lowered.

c) The prior art unit cannot determine whether the surface of the sensor is contaminated or the sensor is defective when the output of the intensity of infrared rays becomes even abnormally low.

d) Generally a highly sensitive infrared sensor is very sensitive to environmental temperature and its output drifts regardless of the intensity of the incident light due to the temperature of the sensor itself or to infrared rays radiating from the inner wall of the sensor housing. Accordingly, a correct temperature of the object cannot be detected. This is a problem especially when the amount of incident light is very small because its signal and drift become relatively very close.

SUMMARY OF THE INVENTION

It is, accordingly, an object of the present invention to solve the aforementioned problems by providing the following means. That is, a temperature monitoring unit of the present invention is provided with:

1) a plate having a generally rectangular slit interposed between the mirror and the infrared sensor, the long sides of the slit extending approximately perpendicular to the surface of the heating element; further, the width of the slit may be adjustable; or 2) a generally rectangular optical converging system provided radially outwardly of the heating element which includes a generally rectangular lens oriented with the long sides of the lens extending generally perpendicular to the surface of the heating element so that infrared rays reflected from the mirror are converged onto the infrared sensor; or 3) a rectangular mirror which is provided in the vicinity of the rotary heating element, which reflects infrared rays generated from a thermal point on the heating element in the radial direction thereof, which reciprocates linearly in the radial direction, and which has the shorter sides thereof extending generally parallel to the surface of the heating element.

Further, the temperature monitoring unit of the present invention may also be provided with:

4) a shutter provided between the mirror and the infrared sensor for selectively blocking infrared rays reflected toward the infrared sensor by the mirror;

a polarity inverting amplifier which receives the output of the infrared sensor through a switch;

a voltage buffer which has the output of the polarity inverting amplifier input thereto and holds the input; and a summing amplifier which receives, sums and amplifies outputs of the voltage holder and the infrared sensor;

5) means provided facing the infrared sensor and/or mirror at a predetermined angle for generating infrared rays having a uniform intensity;

comparing means which receives the output from the infrared sensor and compares it with a preset reference value; and cleaning means for cleaning the infrared sensor and/or mirror when the comparison made by the comparing means is indicative of the output being outside of a predetermined range; and/or 6) an image processor which receives and image-processes the output of the infrared sensor and displays its intensity by brightness or a color difference in a manner indicative of the position from which the rays have been transmitted from the rotary heating element.

With the means described in item (1) above, if a thermal point exists on the heating element, rays are reflected therefrom by the mirror which is scanned in the radial direction and the reflected light is converged onto the infrared sensor section of the optical detection system.

At this time, infrared rays from around the thermal point are blocked by the plate and the rays passing through the slit impinge the infrared sensor. Accordingly, the sensitivity (S/N) that is the ratio of an area of the thermal point to an area of the opening of the slit is high. Moreover, the visual field that passes through the slit, i.e. the extent of the infrared rays coming from the thermal point and around it, is long in the radial direction of the heating element, i.e. is generally rectangular. Therefore, the mirror can scan the entirety of the heating element with high speed. Thus, the thermal point can be detected with a high degree of sensitivity even for a large heating element.

Further, the width of the slit can be adjusted so that S/N becomes maximum for the light coming from vicinity of the thermal point, i.e. noise, whereby the sensitivity is further improved.

With the means described in item (2) above, a lens of the optical system has long sides extending approximately perpendicular to the surface of the heating element so that the optical system achieves almost the same effect as in the case when the plate having a slit is used.

With the means described in item (3) above, the visual field of rays reflected from the mirror and entering the lens system is almost identical with the visual field that passes through the opening of the slit in the plate described in item (1) above. Thus, almost the same effects are achieved.

With the means described in item (4) above, the shutter is closed at first and the switch is turned on when the drift of the infrared sensor is to be compensated for. Then the infrared rays propagating toward the infrared sensor are blocked and the output of the infrared sensor at that time (0 level output) is inputted to the polarity inverting amplifier having a gain of one and from there are inputted to the voltage buffer. The voltage buffer holds the input. Next the shutter is opened and the switch is turned off. Then the summing amplifier sums and amplifies the outputs of the infrared sensor and the inverting amplifier. Thus, a correct intensity of the infrared rays of the object, of which the drift is compensated for, is detected.

With the means described in item (5) above, the fact that the infrared sensor and the other optical elements are not operating correctly and need to be cleaned can be detected. The infrared sensor detects infrared rays released from the means which generates infrared rays having a uniform intensity. The comparing means receives the output of the infrared sensor and compares it with a preset reference value and generates signals indicative of the comparison. The cleaning means operates when the signals exceed a predetermined range and cleans the infrared sensor and/or mirror. Thus, because the present invention cleans the infrared sensor and/or mirror, etc. when they are operating abnormally, the monitoring unit is always operated correctly.

With the means described in item (6) above, the thermal point on the heating element is detected and is automatically displayed by being image-processed.

DETAILED DESCRIPTION OF THE PREFERRED EMBODIMENT

Figure 1:
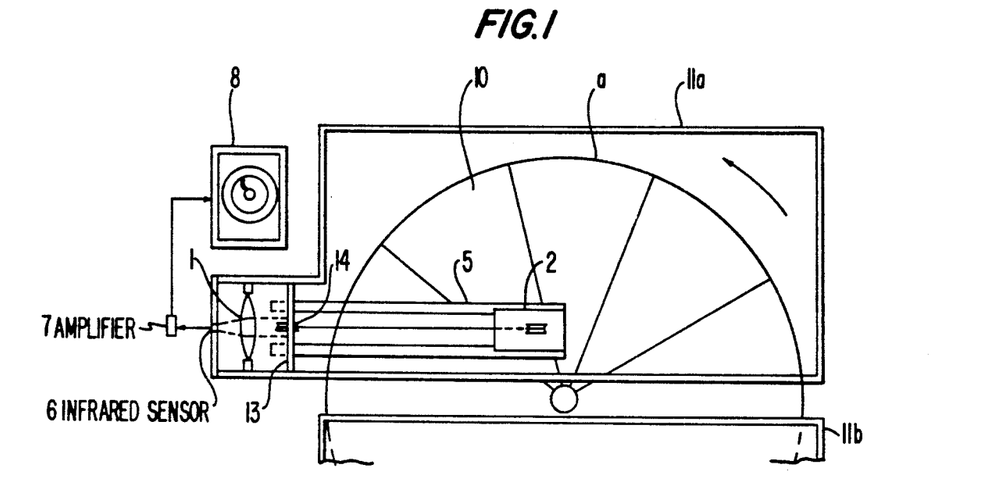
FIG. 1 is a cross-sectional view, taken generally parallel to the surface of a heating element, of one preferred embodiment of a temperature monitoring unit according to the present invention.
Figure 2:
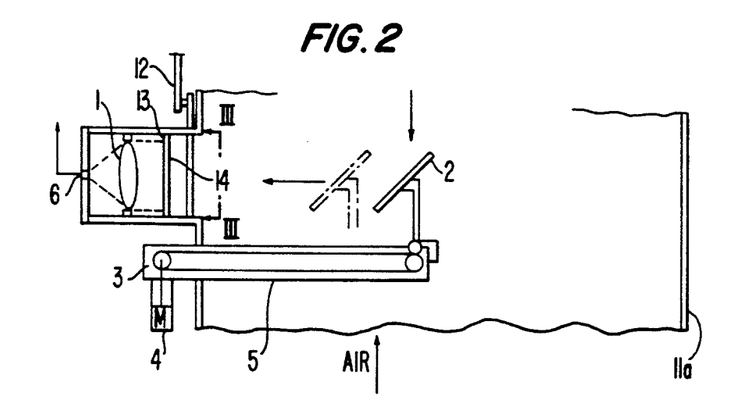
FIG. 2 is a longitudinal sectional view, taken perpendicular to the surface of the heating element, of the monitoring unit shown in FIG. 1.

In FIGS. 1 and 2, a cylindrical heating element 10 is provided within ducts 11a and 11b, whose one sides are opposed to each other. The cylindrical heating element 10 rotates about an axis extending longitudinally of the ducts. A rail 5 is provided in the radial direction of the heating element 10 as extending along the side of the duct 11a opposite the side of duct 11b and over the surface a of the heating element 10. A mirror 2 that moves along the rail 5 is provided so that it reflects light from the surface a of the heating element 10 in a direction parallel to the longitudinal direction of the rail 5, i.e. toward the outside of the heating element 10 in the radial direction of the heating element 10. A driving device 3 drives the mirror 2 by being driven by a drive motor 4.

Figure 3:
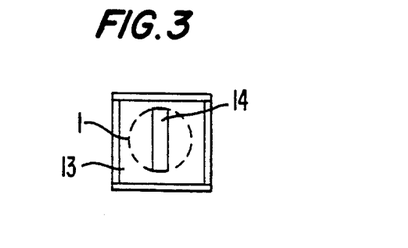
FIG. 3 is a view taken in the direction of arrows III—III in FIG. 2.

The reflected light from the mirror 2 hits an infrared sensor 6 via an opening (slit) 14 in a plate 13 and a condenser lens (convex lens) 1. The opening 14 in the plate 13 has a generally rectangular shape which is elongate in the direction perpendicular to the surface a of the heating element 10 as shown in FIG. 3. Its width is adjusted to a predetermined width corresponding to the dimension of a thermal point. Output of the infrared sensor 6 is sent to an image processor 8 via an amplifier 7. Reference numeral 12 in the figure indicates a rod of a shutter opening and closing mechanism which will be described in more detail later on.

In the above monitoring unit, the surface a of the heating element 10 is scanned by the mirror 2 when the mirror 2 reciprocates along the rail 5. Infrared rays reflected by the mirror 2 are converged by the condenser lens 1, after having passed through the opening 14 in the plate 13, and impinge the infrared sensor 6. The infrared sensor 6 detects the infrared rays and generates and sends signals to the image processor 8 via the signal amplifier 7. The image processor 8 processes the input signals and displays information indicative of the thermal point (abnormally high temperature portion) on the surface a of the heating element, on a CRT. This information is in the form of light intensity or color codes. Since the infrared rays from the mirror 2 pass through the opening (slit) 14 in the plate 13 in the above process, they will appear in a rectangular shape which is long in the radial direction of the heating element 10 as shown in FIG. 4a.

Figure 4A:
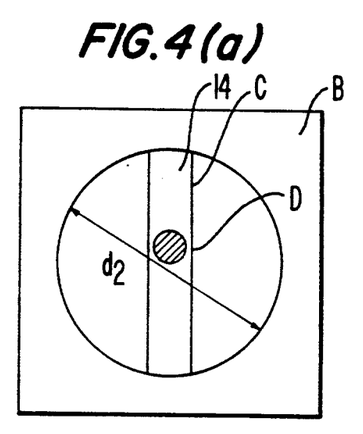
FIGS. 4a, 4b and 4c are schematic diagrams illustrating an effect achieved by the embodiment shown in FIG. 1.
Figure 4B:
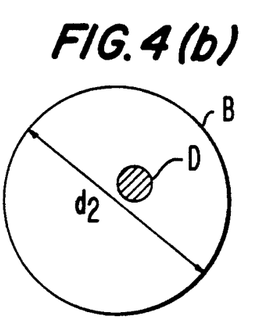
Figure 4C:
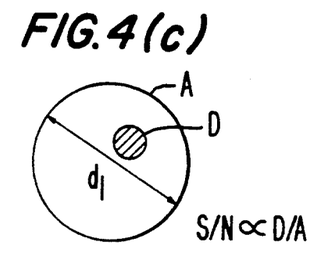

The sensitivity of the condenser lens (sensitivity of the infrared sensor 6), i.e. S/N can be represented by the following expression (1) (see FIG. 4(a));

$$S/N \propto D/C \quad (1)$$

where D is an area of the thermal point and C is an area of the opening. FIG. 4(b) shows a case when there is no plate 13, having a slit, i.e. wherein sensitivity is represented by the following expression (2):

$$S/N \propto D/B \quad (2)$$

wherein B is an area of the condenser lens. FIG. 4(c) shows a case in which a conventional lens is used.

B is larger than C in the expressions (1) and (2). This shows that the sensitivity is much better when the plate 13 having the slit therein is provided. Also since the longitudinal axis of the opening 14 is perpendicular to the surface a, the field of the beam that enters the condenser lens 1 is relatively long in the radial direction of heating element 10. Accordingly, the speed in which the mirror 2 can scan the heating element is relatively high.

Thus, the present invention allows even a large heating element 10, which has larger diameter than conventional ones, to be monitored quickly and with a high degree of sensitivity.

Figure 5:
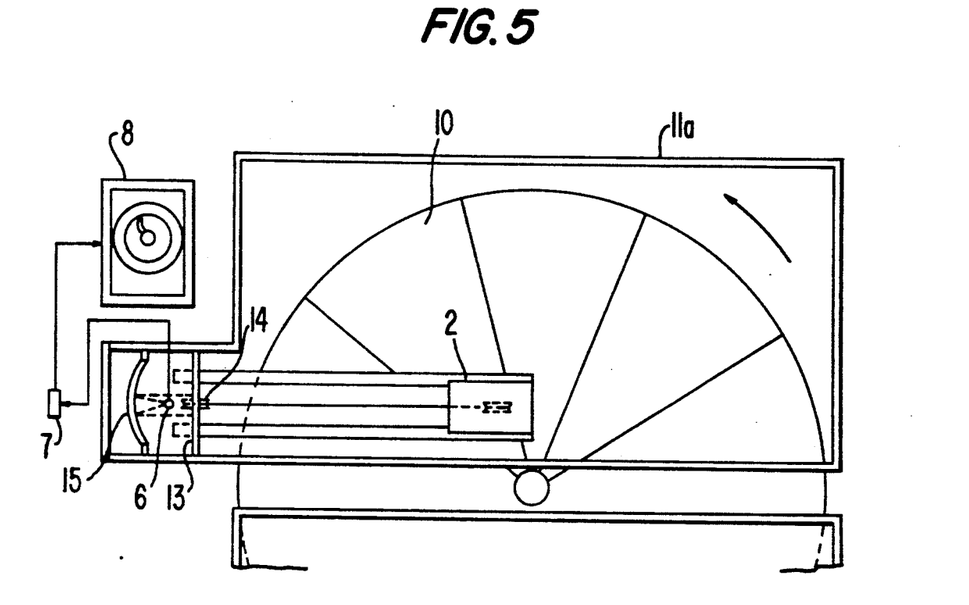
FIG. 5 is a cross-sectional view, taken generally parallel to the surface of a heating element, of another preferred embodiment of a temperature monitoring unit according to the present invention.
Figure 6:
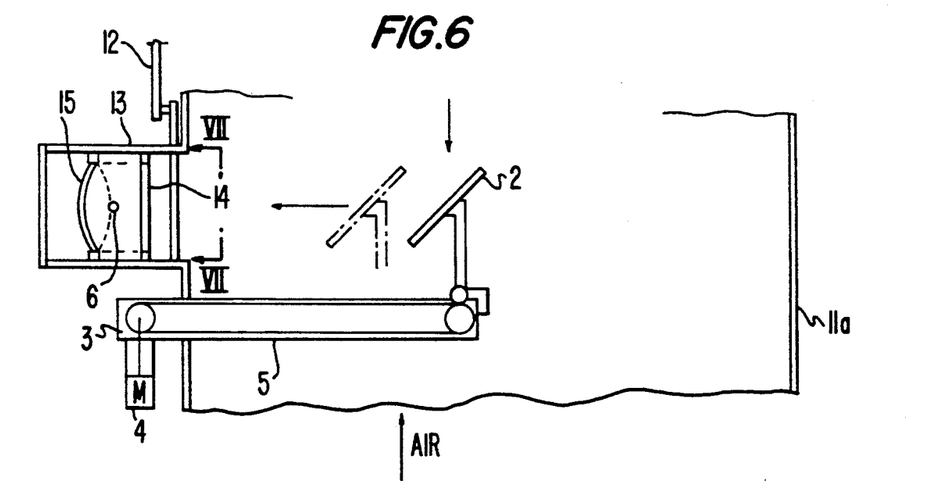
FIG. 6 is a longitudinal sectional view, taken perpendicular to the surface of the heating element, of the monitoring unit shown in FIG. 5.
Figure 7:
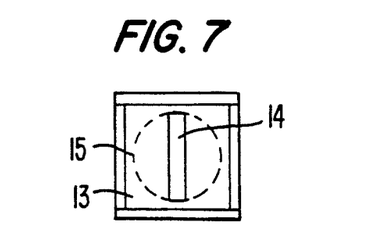
FIG. 7 is a view taken in the direction of arrows VII—VII in FIG. 6.

FIGS. 5 through 7 show another preferred embodiment in which a concave mirror is used instead of the condenser lens (convex lens). In the figures, reference numeral 15 denotes the concave mirror. Its function and effect is almost the same as described above, and so a detailed explanation thereof is omitted here.

Next, another preferred embodiment of a temperature monitoring unit according to the present invention will be explained with reference to FIGS. 8 to 10.

Figure 8:
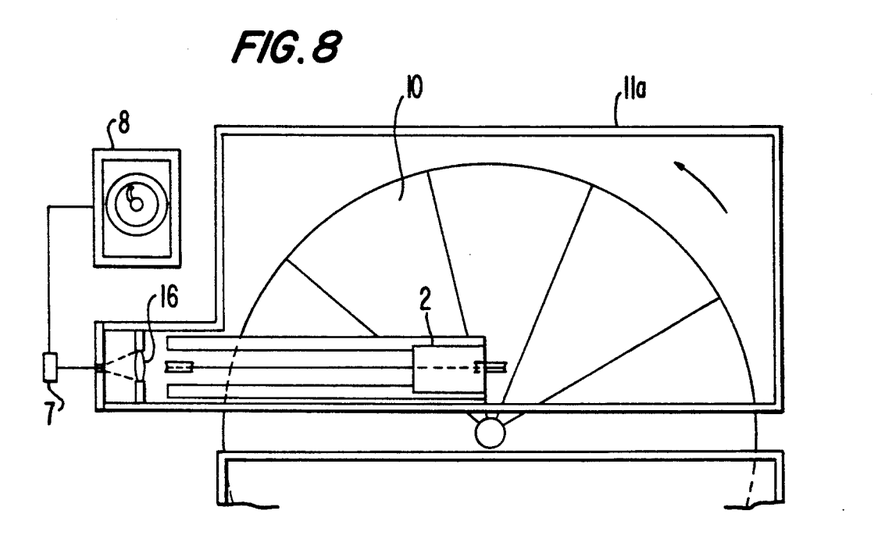
FIG. 8 is a cross-sectional view, taken generally parallel to the surface of a heating element, of another preferred embodiment of a temperature monitoring unit according to the present invention.
Figure 9:
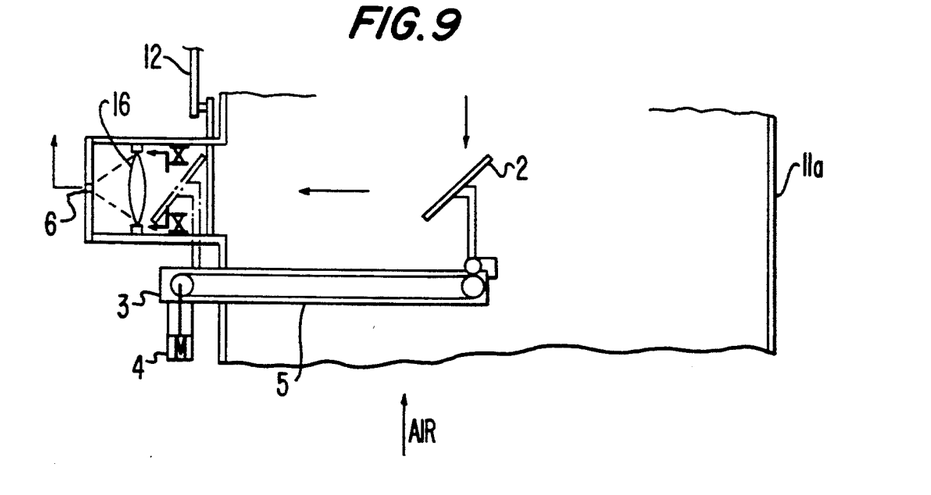
FIG. 9 is a longitudinal sectional view, taken perpendicular to the surface of the heating element, of the monitoring unit shown in FIG. 8.

As shown in FIGS. 8 and 9, a convex lens 16 having a configuration that is elongate in the direction perpendicular to the surface of the heating element 10 (see FIG. 10) is provided instead of the plate 13 and condenser lens of the previous embodiments.

Figure 10:
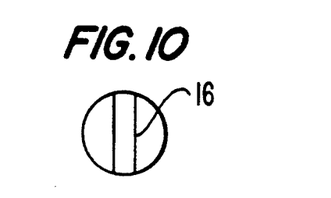
FIG. 10 is a view taken in the direction of arrows X—X in FIG. 9.

In the above construction, rays that propagate toward the infrared sensor 6 are restricted by the shape of the convex lens 16 as shown in FIG. 10, in the same manner as when the plate 13 having slit 14 is used. Accordingly, almost the same effect as described with respect to the first embodiment shown in FIG. 1 can be obtained.

Figure 11:
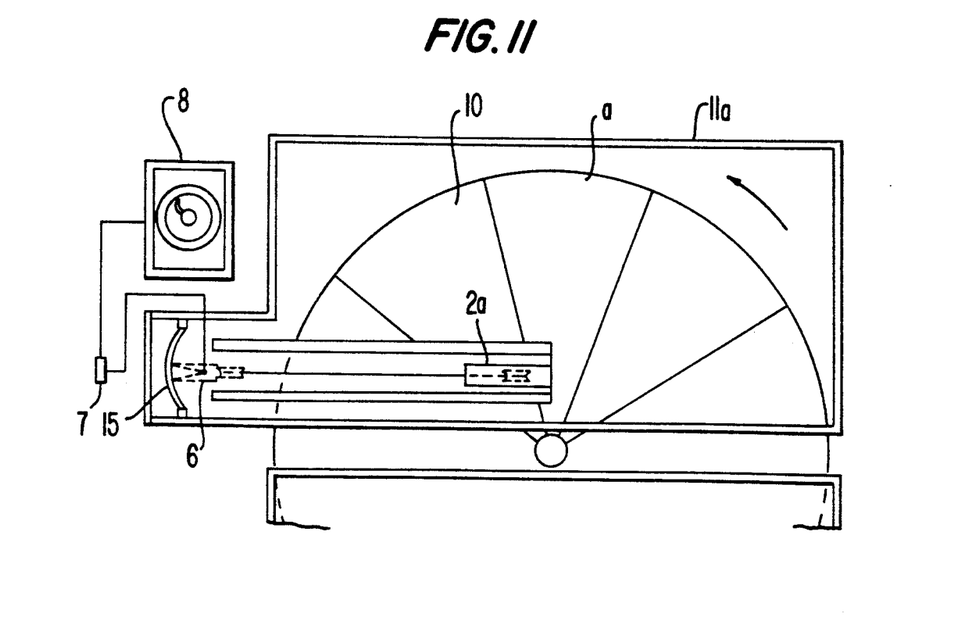
FIG. 11 is a cross-sectional view, taken generally parallel to the surface of a heating element, of still another embodiment of a temperature monitoring unit according to the present invention.
Figure 12:
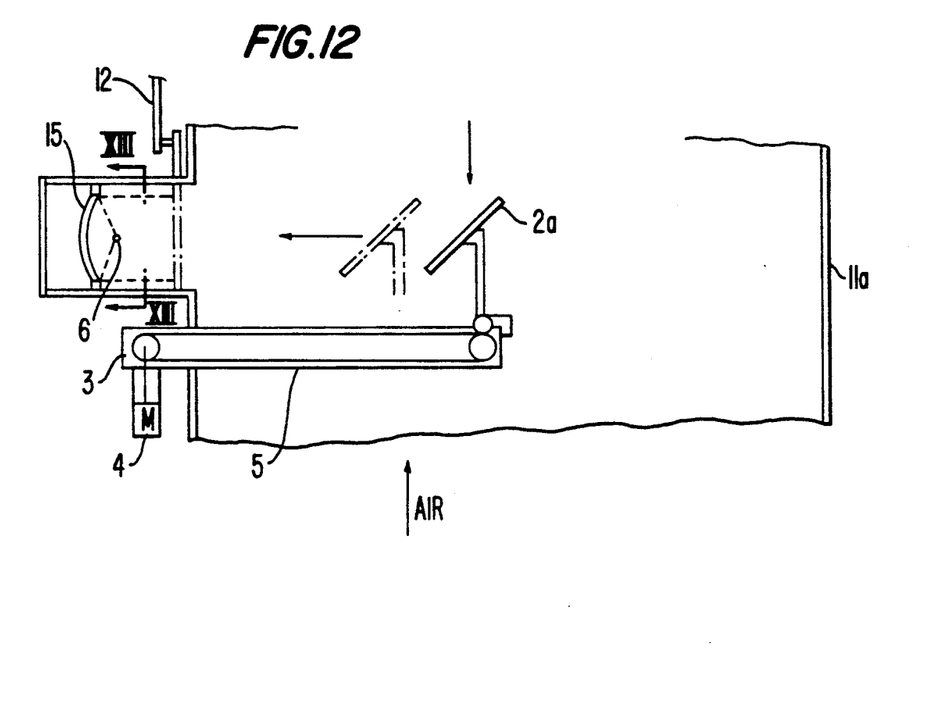
FIG. 12 is a longitudinal sectional view, taken perpendicular to the surface of the heating element, of the monitoring unit shown in FIG. 11.
Figure 13:
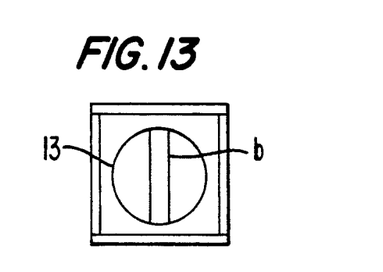
FIG. 13 is a view taken in the direction of arrows XIII—XIII in FIG. 12.

Referring now to FIGS. 11 to 13, still another preferred embodiment of a monitoring unit according to the present invention will be explained.

As shown in FIGS. 12 and 13, a rectangular mirror 2a whose shorter sides extend parallel to the surface a of the heating element 10 is employed instead of the mirror 2 and plate 13 of that previously described embodiment.

In the above construction, a visual field of rays b that impinge the concave mirror 15 is rectangular having the width of the mirror 2a as shown in FIG. 13. Accordingly, almost the same effect as described with respect to the embodiment shown in FIGS. 8 to 10 can be obtained.

Figure 14:
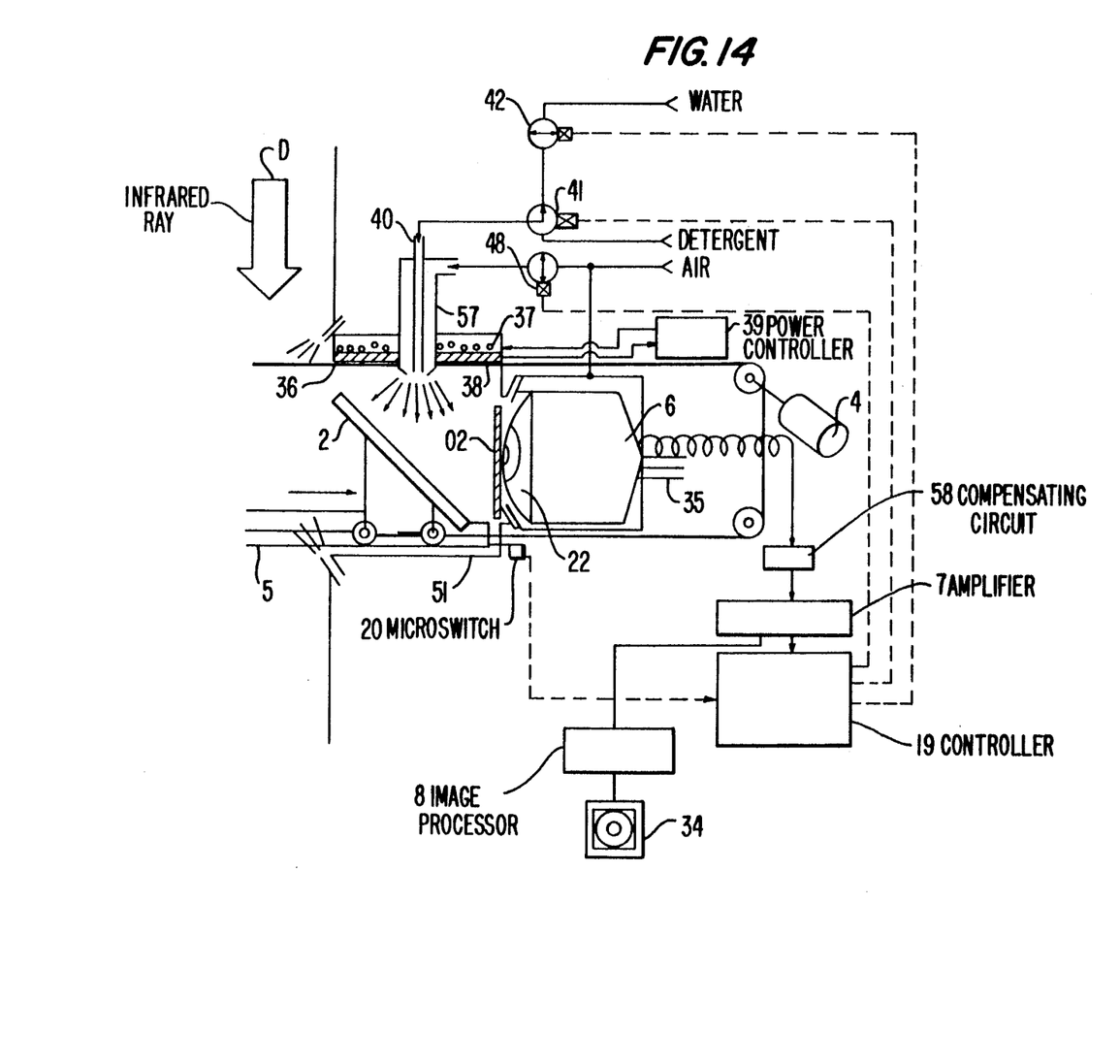
FIG. 14 is a schematic diagram of an infrared sensor section of the preferred embodiments of the temperature monitoring units according to the present invention.
Figure 15:
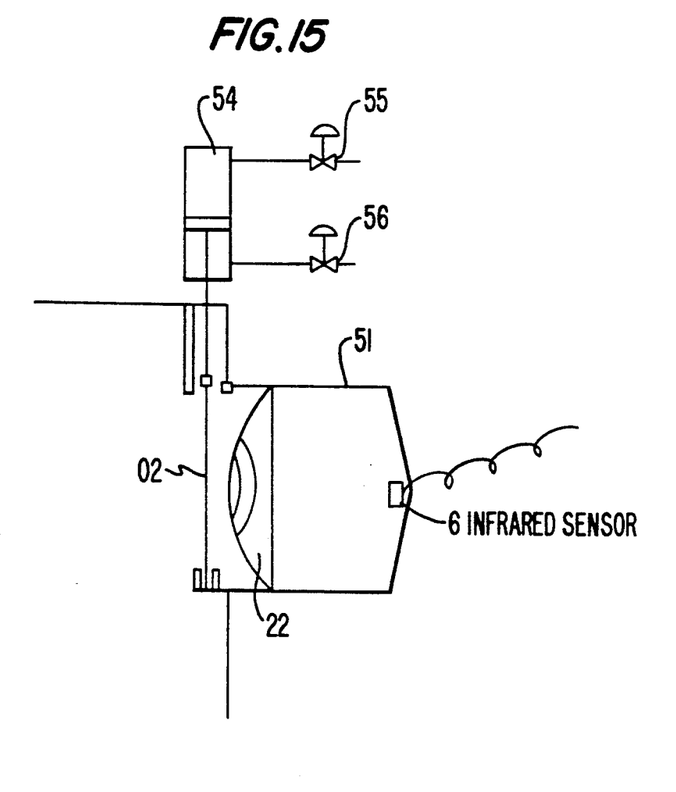
FIG. 15 is a schematic diagram of a shutter system of the infrared sensor section according to the present invention.
Figure 16:
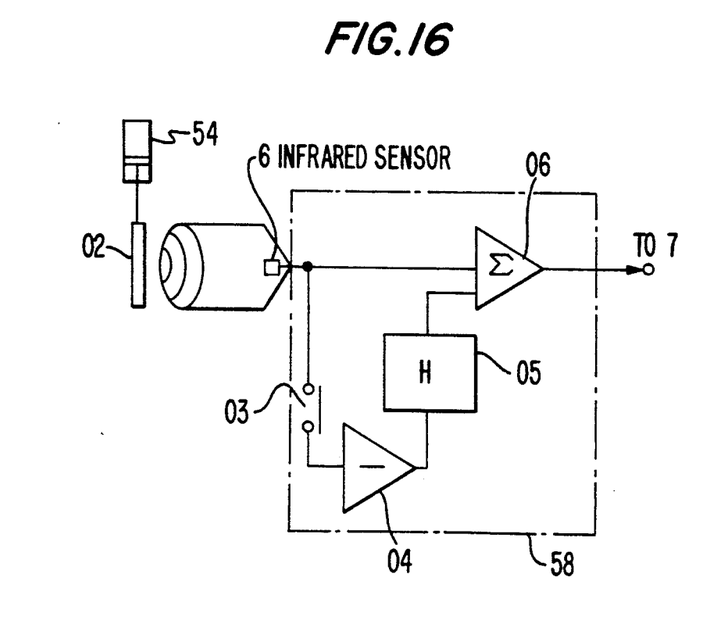
FIG. 16 is a schematic diagram of the infrared sensor section and a drift compensating circuit according to the present invention.

Referring now to FIGS. 14, 15 and 16, still another preferred embodiment of a monitoring unit according to the present invention will be explained.

In FIGS. 14 and 15, a shutter 02 is provided in front of a lens 22 of the infrared sensor 6, i.e. at the mirror 2 side. The upper edge of the shutter 02 is connected to an air cylinder 54 (shutter opening and closing mechanism). Reference numerals 55 and 56 denote solenoid valves.

As shown in FIG. 16, the output of the infrared sensor 6 is inputted to a switch 03 and a summing amplifier 06. The output of the switch 03 is then sent to the summing amplifier 06 via a polarity inverting amplifier 04 having a gain of one and a voltage buffer 05. These elements constitute a drift compensating circuit 58. The output of the summing amplifier 06 is sent to the image processor 8 via amplifier 7.

In order to compensate for drift of the infrared sensor in the above embodiment, the solenoid valve 55 is first opened and the shutter 02 is moved down by the air cylinder 54. The shutter 02 is thus closed and the incidence of infrared rays onto the infrared sensor 6 is blocked. Then the switch 03 is turned on, and the output of the infrared sensor 6 when the incident light is blocked is inverted by the polarity inverting amplifier 04 having a gain of one and is sent to the voltage buffer 05. The voltage buffer 05 holds the input.

Next, when the solenoid valve 56 is opened and air is supplied, the shutter 02 moves up and the switch 03 is turned off. Then the outputs of the infrared sensor 6 and the inverting amplifier 04 held are summed and amplified by the summing amplifier 06. Thus, the correct infrared intensity of the object, in which intensity the drift has been compensated for, is detected and transmitted to the image processor 8.

In the image processor 8, levels of the infrared rays are color-coded based on the intensity levels thereof and are displayed so that the absolute outputs of the sensor and the displayed colors correspond to each other. Accordingly, the problem of the drift is eliminated and the temperature is displayed in a highly reliable manner.

Furthermore, as shown in FIG. 14, a means for generating infrared rays having a uniform intensity, e.g. a radiant plate 36, is provided on the upper surface of a housing 51 in front of the lens 22. The surface of the radiant plate 36 is polished with aluminate, is colored black and is oriented to face the mirror 2 at a predetermined angle. A heater 37 which is connected to a power controller 39 is provided in back of the radiant plate 36.

Coaxial water and detergent nozzle 40 and air nozzle 57 having nozzle opening facing downward are provided on the upper surface of the housing 51. The air nozzle 57 is connected to an air supply via a solenoid valve 48. The water and detergent nozzle 40 is connected to a water supply via a water and detergent solenoid valve 41 and a water solenoid valve 42. The water and detergent solenoid valve 41 is also connected to a detergent supply.

The shutter 02 is provided on the mirror side of the lens 22 of the infrared sensor 6. FIG. 15 shows the detail of the shutter 02.

The output of the infrared sensor 6 is transmitted successively to the compensating circuit 58, the signal amplifier 7, the image processor 8 and a display unit 34. Moreover, the output of the signal amplifier 7 is transmitted to the solenoid valves 41, 42, 55, 56 and 48 via controller 19. A micro-switch 20 which is activated by a support base of the mirror 2 is connected to the controller 19.

FIG. 16 shows the detail of the drift compensating circuit 58. An electronic cooling element is mounted to the infrared sensor 6 so that the infrared sensor 6 can be cooled or otherwise regulated to an almost constant temperature without being influenced by the environmental temperature so as not to overheat. Reference numeral 35 denotes a heat releasing plate of the electronic cooling element. A plate having a slit such as that described above may be provided in front of the shutter.

In the above embodiment, when the performance of the infrared sensor 6 decreases, the lens 22, the mirror 2 and the other elements are inspected. In this case, the mirror 2 moves into the housing 51 and a portion of its support base pushes the micro-switch 20, thereby activating the power controller 39 and the solenoid valve controller 19.

At first, the power controller 39 starts feeding power to the heater 37 and while receiving feedback from a thermocouple 38, controls the current to the heater 37 to keep the temperature of the surface of the radiant plate 36 constant. Accordingly, the mirror 2 reflects the constant intensity infrared rays radiated from the radiant plate 36 and the reflected light is converged onto a sensor element within the sensor via the lens 22 of the infrared sensor 6.

Since the intensity of the infrared rays radiated from the radiant plate 36 is uniform, the infrared sensor 6 should indicate a constant output unless the surface of the mirror 2 or the lens 22 is contaminated.

Changes in the reflective capability of the mirror 2 and in the sensitivity of the infrared sensor 6 are thus dealt with in the following manner:

a) the output of the infrared sensor 6 is compared with a preset reference value in the signal amplifier 7 and when the output of the sensor is lower than the reference value, the controller 19 opens the solenoid valve 48 and an air jet is blown onto the mirror 2 from the air nozzle 57 for a certain period of time;

b) if the output of the infrared sensor 6 is not recovered by that time, the solenoid switching valve 41 is switched to the water side and the solenoid valve 42 is opened for a certain period of time to spray a water jet onto the mirror 2 from the water and detergent nozzle 40;

c) if the output of the infrared sensor 6 is still not recovered even by that means, the solenoid switching valve 41 is switched to alternately spray detergent and water onto the mirror 2 from the water and detergent nozzle 40;

d) if the output of the infrared sensor 6 is still not recovered in the above procedures (a) through (c), the sensor element is determined to be defective and an alarm is initiated by the controller 19.

Thus, signals from the infrared sensor 6, whose drift is compensated for by the compensating circuit 58, are inputted to the image processor 8. Furthermore, a decrease in the performance of the mirror 2, lens 22 and the infrared sensor 6, etc. is detected and these element are not automatically cleaned so as to always input accurate signals to the image processor 8. Accordingly, a reliable temperature monitoring un:,t is realized.

As described above, according to the present invention, the sensitivity (S/N) of the infrared sensor for detecting infrared rays from a thermal point of the heating element is improved. Moreover, the visual field of rays that are transmitted to the infrared sensor is elongate in the radial direction of the rotary heating element, i.e. is rectangular so that the mirror can quickly scan the entirety of the surface of the heating element.

Accordingly, the present invention allows a heating element of a larger diameter than conventional ones to be reliably monitored. The present invention also monitors the temperature in a highly reliable manner because the drift of the infrared sensor is compensated for and a decrease in the performance of the mirror, infrared sensor and lens, etc. is detected and eliminated.

What is claimed is:

1. A temperature monitoring unit for monitoring the temperature of a surface of a rotary heating element, said monitoring unit comprising:

an infrared sensor disposed radially outwardly of the rotary heating element; and optical transmitting means for transmitting light to said infrared sensor from only a generally rectangular visual field on the surface of the heating element, longer sides of the rectangular visual field extending in the radial direction of said rotary heating element, and for scanning the surface of rotary heating element in said radial direction such that the rectangular visual field from which light is transmitted from the surface of the rotary heating element to the infrared sensor is moved across the surface of the rotary heating element in said radial direction, said optical transmitting means including a mirror oriented to reflect light from the surface of the rotary heating element toward the infrared sensor, drive means connected to said mirror for reciprocating said mirror linearly in said radial direction of the heating element, and a plate interposed between said mirror and said infrared sensor, said plate having a generally rectangular slit extending therethrough, longer sides of said slit lying in planes extending perpendicular to the surface of said rotary heating element.

2. A temperature monitoring unit as claimed in claim 1, wherein the width of said slit is adjustable.

3. A temperature monitoring unit as claimed in claim 1, wherein said mirror has a generally rectangular shape, shorter sides of said mirror extending generally parallel to the surface of the rotary heating element.

4. A temperature monitoring unit for monitoring the temperature of a surface of a rotary heating element, said monitoring unit comprising:

an infrared sensor disposed radially outwardly of the rotary heating element; and optical transmitting means for transmitting light to said infrared sensor from only a generally rectangular visual field on the surface of the heating element, longer sides of the rectangular visual field extending in the radial direction of said rotary heating element, and for scanning the surface of rotary heating element in said radial direction such that the rectangular visual field from which light is transmitted from the the surface of the rotary heating element to the infrared sensor is moved across the surface of the rotary heating element in said radial direction, said optical transmitting means including a mirror oriented to reflect light from the surface of the rotary heating element toward the infrared sensor, drive means connected to said mirror for reciprocating said mirror linearly in said radial direction of the heating element, and a lens interposed between said mirror and said infrared sensor, said lens having a generally rectangular shape, shorter sides of said lens extending generally parallel to the surface of the heating element.

5. A temperature monitoring unit as claimed in any one of claims 1-4, and further comprising a shutter interposed between said mirror and said infrared sensor, a polarity inverting amplifier, a switch connecting said infrared sensor to said polarity inverting amplifier, a voltage buffer operatively connected to said polarity inverting amplifier so as to hold a value input to the buffer from said amplifier, and a summing amplifier operatively connected to said infrared sensor and to said voltage buffer so as to receive, sum and amplify outputs of said voltage holder and said infrared sensor.

6. A temperature monitoring unit as claimed in claim 5, and further comprising infrared ray generating means for generating infrared rays having a uniform intensity in a direction in which the rays will propagate toward said infrared sensor, a controller means operatively connected to said infrared sensor for comparing the output of said sensor with a predetermined reference data, and cleaning means operatively connected to said controller means for cleaning said infrared sensor and/or said mirror when the comparison made by said controller means is indicative of the output of said infrared sensor being abnormal.

7. A temperature monitoring unit as claimed in claim 6, and further comprising an image processor operatively connected to said infrared sensor.

8. A temperature monitoring unit as claimed in claim 5, and further comprising an image processor operatively connected to said infrared sensor.

9. A temperature monitoring unit as claimed in any one of claims 1-4, and further comprising an image processor operatively connected to said infrared sensor.

10. A temperature monitoring unit as claimed in any one of claims 1-4, and further comprising infrared ray generating means for generating infrared rays having a uniform intensity in a direction in which the rays will propagate toward said infrared sensor, controller means operatively connected to said infrared sensor for comparing the output of said sensor with a predetermined reference data, and cleaning means operatively connected to said controller means for cleaning said infrared sensor and/or said mirror when the comparison made by said controller means is indicative of the output of said infrared sensor being abnormal.

11. A temperature monitoring unit as claimed in claim 10, and further comprising an image processor operatively connected to said infrared sensor.

* * * * *